United States Patent
Lee et al.

[11] 3,904,604
[45] Sept. 9, 1975

[54] 1-AMINO SUBSTITUTED 1-CYCLOALKANE DERIVATIVES OF 6-AMINOPENICILLANIC ACID

[75] Inventors: Bong Kuk Lee, Old Bridge; Saul Lewis Neidleman, Trenton, both of N.J.; Dewey D. Y. Ryu, Holliston, Mass.

[73] Assignee: E. R. Squibb & Sons, Inc., Princeton, N.J.

[22] Filed: Aug. 21, 1972

[21] Appl. No.: 282,095

Related U.S. Application Data

[63] Continuation-in-part of Ser. No. 176,717, Aug. 31, 1971, abandoned.

[52] U.S. Cl............................. 260/239.1; 424/271
[51] Int. Cl............................................ C07d 99/16
[58] Field of Search ............................... 260/239.1

[56] References Cited
UNITED STATES PATENTS
| | | | |
|---|---|---|---|
| 3,351,587 | 11/1967 | Alburn et al..................... | 260/239.1 |
| 3,594,366 | 7/1971 | Grant et al...................... | 260/239.1 |

FOREIGN PATENTS OR APPLICATIONS
| | | | |
|---|---|---|---|
| 748,419 | 12/1966 | Canada............................ | 260/239.1 |

*Primary Examiner*—Nicholas S. Rizzo
*Assistant Examiner*—Mary C. Vaughn
*Attorney, Agent, or Firm*—Lawrence S. Levinson; Merle J. Smith; Stephen B. Davis

[57] ABSTRACT

Disclosed herein are novel compounds of the formula

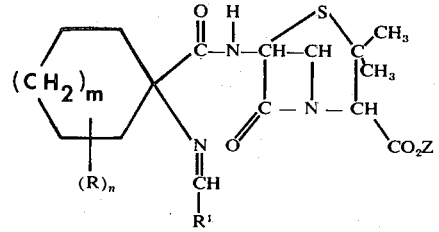

I and

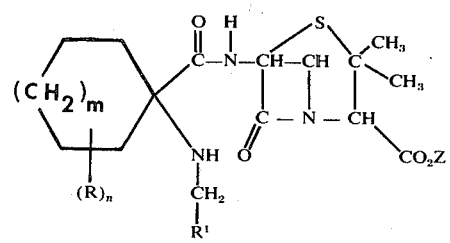

II wherein $m$ is 0, 1 or 2; R is alkyl of from 1 to 7 carbon atoms, hydroxy or halogen; $n$ is 0, 1, 2 or 3; $R^1$ is phenyl, naphthyl, substituted phenyl or naphthyl wherein the substituent is halogen, hydroxy, or alkyl, alkoxy or acyl, each of from 1 to 4 carbon atoms, or amido; and Z is hydrogen, alkyl of from 1 to 7 carbon atoms or a salt forming ion. These compounds, prepared by condensing a Schiff's base of a 1-amino substituted 1-cycloalkane carboxylic acid with 6-APA, are useful as antibacterial agents.

6 Claims, No Drawings

1-AMINO SUBSTITUTED 1-CYCLOALKANE DERIVATIVES OF 6-AMINOPENICILLANIC ACID

RELATED APPLICATION

This application is a continuation-in-part of copending patent application Ser. No. 176,717, now abandoned, filed Aug. 31, 1971 by Bong Kuk Lee, Dewey D. Y. Ryu and Saul Lewis Neidleman, and entitled "1-Amino Substituted-1-Cyclopentane Derivatives of 6-Aminopenicillanic Acid."

DETAILED DESCRIPTION

This invention relates to new derivatives of 6-aminopenicillanic acid (6-APA) of the formula

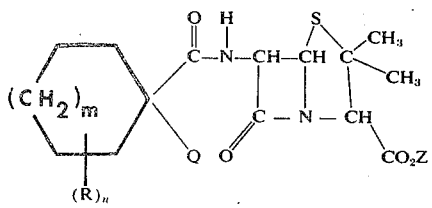

wherein $m$ is 0, 1 or 2; Q is —N=CHR$^1$ or —NH—CH$_2$—R$^1$ wherein propyl, i-propyl, n-butyl, i-butyl, t-butyl, pentyl, 2-methylbutyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, or 2,2,3-trimethylbutyl), cycloalkyl of from 5 to 7 carbon atoms (cyclopentyl, cyclohexyl, cycloheptyl, methylcyclopentyl, 1,1-dimethylcyclopentyl or methylcyclohexyl), phenyl, naphthyl, substituted phenyl or naphthyl, preferably ortho, wherein the substituent is halogen (F, Cl, Br or I), hydroxy, alkyl of from 1 to 4 carbon atoms (methyl, ethyl, propyl, i-propyl, butyl, i-butyl, or t-butyl), alkoxy of from 1 to 4 carbon atoms (methoxy, ethoxy, propoxy, i-propoxy, butoxy, i-butoxy or t-butoxy), acyl of from 1 to 4 carbons (formyl, acetyl, propionyl, i-propionyl, butanoyl, or 2-methylbutanoyl), or amido; R is alkyl of from 1 to 7 carbon atoms (methyl, ethyl, propyl, i-propyl, n-butyl, i-butyl, t-butyl, pentyl, 2-methylbutyl, neopentyl, hexyl, 2-methylpentyl, 3-methylpentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpenty, or 2,2,3-trimethylbutyl), hydroxy or halogen (F, Cl, Br or I); and Z is hydrogen, alkyl of from 1 to 7 carbon atoms (methyl, ethyl, propyl, i-propyl, n-butyl, i-butyl, t-butyl, pentyl, 2-methylbutyl, neopentyl, hexyl, 2-methylpentyl, 3-methypentyl, 2,2-dimethylbutyl, 2,3-dimethylbutyl, heptyl, 2-methylhexyl, 3-methylhexyl, 2,2-dimethylpentyl, 2,3-dimethylpentyl, 2,4-dimethylpentyl, 3,3-dimethylpentyl, 3-ethylpentyl, or 2,2,3-trimethylbutyl) or a salt forming ion (an alkali metal, e.g., Na or K, an alkaline earth metal, e.g., Ca or Mg, or an organic base, e.g., dibenzylamine or N,N-dibenzylethylenediamine), and $n$ is 0, 1, 2 or 3. Also included in the scope of the present invention are the optical antipodes of the foregoing compounds which are optically active.

The compounds I and II of the present invention are prepared by condensing 6-APA or a salt thereof under known conditions with an acid or acyl halide of the formula

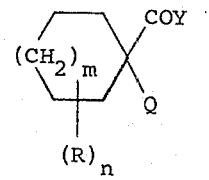

wherein $m$, R, $n$ and Q are as previously defined and Y is OH, Cl or Br.

The temperature at which the condensation reaction is carried out is not critical. However, the process of the present invention may conveniently be carried out at a temperature of from about −25° to about 50°, preferably from about −10° to about 30°. It is further desired that the reaction environment not be too strongly akaline or acidic (e.g., between pH 3 and pH 9 is preferred). Organic solvents, especially those which are inert to the reactants and condensation agents which may be present, are suitable as the reaction medium. Such solvents are, for example, acetone, chlorinated hydrocarbons such as methylene chloride or chloroform; ethers such as tetrahydrofuran or dioxane; or dimethylformamide.

The compounds I of the present invention may also be prepared by reacting under known conditions a compound of formula IV (wherein Y is OH and Q is —N=CHR$^1$) with an acyl halide of the formula

wherein X is Cl or Br to form a mixed anhydride of the formula

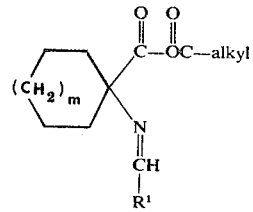

which mixed anhydride is then reacted with 6-APA. The reaction of the compound of formula IV with the acyl halide is carried out in a mixture of solvents such as acetone, dioxane and lutidine at temperatures ranging from about −10° to about 20°, preferably from about −10° to about 10°, employing a molar ratio of acyl halide to compound of formula IV within the range of from about 1:1 to about 3:1, preferably 1.1:1 to 1.5:1.

The reaction of the mixed anhyhdride with 6-APA is carried out in an aqueous solvent such as aqueous sodium bicarbonate at a temperature with the range of from about −15° to about 5° and preferably from about −5° to about 0° employing a molar ratio of mixed anhydride to 6-APA within the range of from about 1:0.8 to about 2:1, and preferably from about 1.1:1 to about 1.5:1.

The compounds II of the present invention can be prepared by reacting a compound of formula I with a reducing agent such as sodium borohydride, aluminum borohydride, lithium aluminum hydride, or hydrogen in conjunction with a catalyst for reduction such as platinum or palladium.

This reduction can be carried out in water or aqueous solvents, such as gaseous potassium phosphate, at temperatures ranging from about 0° to about 40° and preferably from about 10° to about 20° employing a molar ratio of a compound of formula I to reducing agent within the range of from about 1:2 to about 1:10, and preferably from about 1:4 to about 1:6.

Alternatively, the formula II compounds can be prepared by forming compounds of formula IV wherein Q is —N=CHR$^1$, reducing this compound by reacting it with any of the aforementioned reducing agents to form a compound of the formula

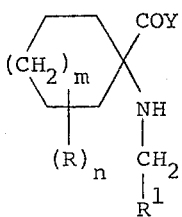

which compound is then reacted under conditions previously described with an acyl halide of the formula

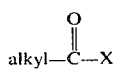

wherein X is Cl or Br to form a mixed anhydride which is then reacted with 6-APA.

The compound of formula IV is prepared by condensing a 1-amino-1-cycloalkane carboxylic acid or a substituted 1-amino-1-cycloalkane carboxylic acid with an aldehyde of the formula

wherein R$^1$ is as previously defined. This condensation is preferably carried out in the presence of an aqueous-alcoholic solvent, such as a mixture of water and methanol, at temperatures ranging from ambient temperature to the boiling point of the solvent. The 1-amino-1-cycloalkane carboxylic acid compound can be employed in a molar ratio to the aldehyde of from about 1:1 to about 1:3, and preferably from about 1:1 to about 1:1.5. The foregoing IV may be converted to the acyl halide by known techniques and/or treated with a reducing agent as indicated previously to yield a compound of formula IV wherein Q is —NHCH$_2$R$^1$ and Y is Cl or Br.

The novel compounds of the present invention are biologically active and have been found to possess antibacterial activity both against gram-postiive and gram-negative causative organisms. As indicated, they are useful antimicrobial agents and have high antimicrobial activity in vitro against standard laboratory micoorganism used to screen for activity against pathogens.

The compounds of the present invention can be used as therapeutics and disinfectants. Accordingly, they can be used in the form of pharmaceutical preparations which contain them or their salts in admixture with a pharmaceutical, organic or inorganic inert carrier material which are suitable for enteral, percutaneous or parenteral application. Suitable carrier materials include, for example, water, gelatin, gum arabic, lactose, starches, magnesium stearate, talc, vegetable oils, polyalkyleneglycols, petroleum jelly, etc. The pharmaceutical preparations can be submitted in solid form (e.g., as tablets, dragees, suppositories, capsules); in semi-solid form (e.g., as salves) or in liquid form (e.g., as solutions, suspensions or emulsions). They may be sterilized and/or contain additives such as preserving, stabilizing, wetting or emulsifying agents, salts for varying the osmotic pressure or buffers. The aforesaid preparations may further be compounded with other therapeutically valuable substances such as other compounds having antibacterial activity.

The compounds of the invention can be administered with dosage adjusted to pharmacological needs. Dosages can be given as a single unit dosage form or in divided dosage units. For oral administration, dosage units containing from about 100 mg. to 400 mg. of the compounds of the present invention can be used. When parenteral administration is employed dosage units containing from about 200 mg. to 300 mg. of the compounds of the invention can be used. Daily dosages of from about 10 mg./kg. of body weight to about 40 mg./kg. of body weight can be used when compounds of the invention are administered orally and when administered parenterally, daily dosages of from 10 mg./kg. to about 25 mg./kg. of body weight can be used. These dosage figures are in no way critical and should, of course, be adjusted according to the best judgment of the person administering the compound and depending on the result desired and the reason for which the compound is being administered.

The invention includes the pharmaceutically acceptable nontoxic salts. Such salts correspond to the compounds of formulas I or II wherein Z is a salt forming ion. Such salt forming ions include nontoxic metals such as Na, K, Mg, Ca or Al. Also included are the ammonium salt and substituted ammonium salts, e.g., salts of such nontoxic amines as trialkylamines, including triethylamine, procaine, dibenzylamine, N-benzyl-β-phenethylamine, N,N'-dibenzylethylenediamine, N-(lower)alkylpiperidine, e.g., N-ethylpiperidine and other amines which have been used to form salts with benzylpenicillin and the like.

Examples of aldehydes which can be employed herein as starting materials include, but are not limited to, the following

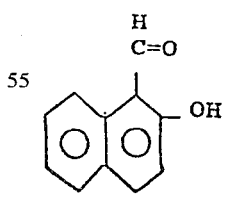

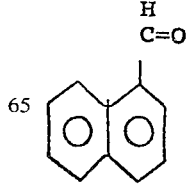

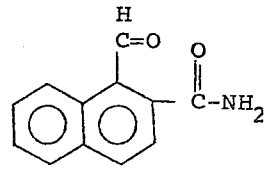

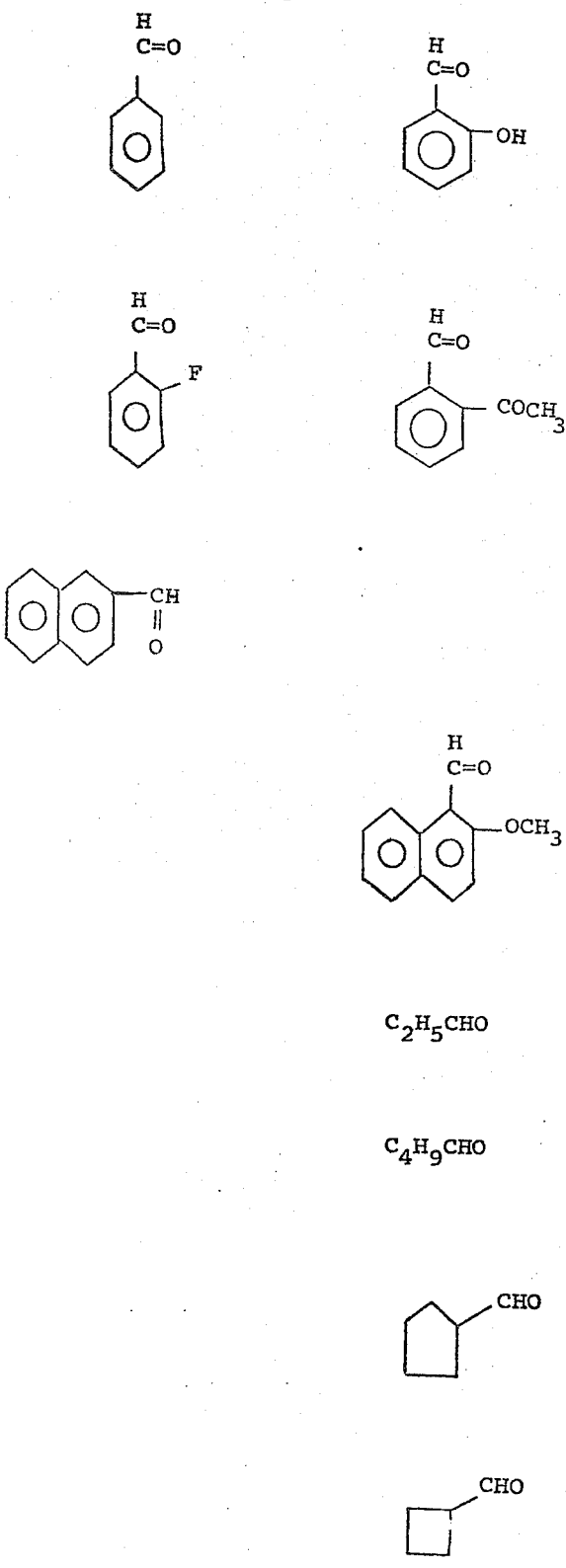

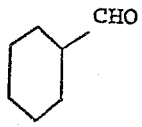

GG105a

The following examples are illustrative of the invention. All temperatures are in degrees Celsius unless otherwise stated.

EXAMPLE 1

6-[[1-[[(2-HDROXY-1-NAPHTHYL)METHYLENE]AMINO]CYCLOPENT-1-YL]CARBOXAMIDO]PENCILLANIC ACID, SODIUM SALT, HYDRATE 5.16 g (40 millimoles) of 1-amino-1-cyclopentanecarboxylic acid and 3.36 g (40 millimoles) of $NaHCO_3$ are dissolved in a hot mixture of 30 ml water and 170 ml methanol. 13.76 g (80 millimoles) of 2-hydroxy-1-naphthaldehyde) are added to the solution, the resulting clear brownish solution refluxed for 3 hrs. the reaction mixture concentrated on a flash evaporator, the dry concentrate washed with ether until ether-washings become clear, and a greenish-yellow product obtained. The product weighs 10.8 g.

2.02 g (6.63 millimoles) of this is suspended in a mixture of 60 ml acetone and 1 ml lutidine, the suspension cooled in an ice bath, 0.48 ml (8 millimoles) of ethyl chloroformate added, and the reaction mixture stirred in an ice bath for 10 min. 1.296 g (6 millimoles) of 6-amino-penicillanic acid (6-APA) is dissolved in a cold mixture of 20 ml water and 2 ml triethylamine, the mixed anhydride, formed as above, cooled in dry ice bath, the 6-APA solution added in one portion to the suspension of mixed anhydride, and reaction for the condensation carried out for ½ hr. in ice bath and for another ½ hr. at room temperature. The resultant reaction mixture, a clear brownish solution, is flash-evaporated at 20°C to remove acetone, the remaining yellowish aqueous suspension extracted 3 × with 70 ml portions of ether, the aqueous layer acidified to pH 2 with 1N HCl and extracted 3 × with 70 ml-portions of ether, the ether extracts washed with 10 ml of water, the washed ether-extracts extracted with 10 ml of 3% $NaHCO_3$ solution, and the $NaHCO_3$ extract (pH 7.2) lyophilized. The crude product, yellowish solid weighs 584 mg. For preparation of an analytical sample, 100 mg. of the crude product is extracted with cold ethyl acetate, a small portion of water added to the ethyl acetate extract, ethyl acetate removed on a flash-evaporator at 10°C. the remaining aqueous solution lyophilized, and 32 mg. of purified product obtained as a yellowish solid. Its analytical data are:

Emp. formula $C_{25}H_{26}N_3SO_5Na \cdot 4H_2O$ (m.p. 171°–172°).

EXAMPLE 2

6-[[1-[[(2-HYDROXYPHENYL)METHYLENE]AMINO]CYCLOPENT-1-YL]CARBOXAMIDO]PENECILLANIC ACID, SODIUM SALT

By utilizing 2-hydroxybenzaldehyde in lieu of 2-hydroxy-1-naphthaldehyde and following the procedures set forth in Example 1 the desired product is recovered.

EXAMPLE 3

6-[[1-[[(2-HYDROXY-1-NAPHTHYL)METHYLENE]AMINO]-2-ETHYLCYCLOPENT-1-YL]CARBOXAMIDO]-PENICILLANIC ACID, SODIUM SALT, HYDRATE

By utilizing 1-amino-1-(2-ethylcyclopentane)carboxylic acid in lieu of 1-amino-1-cyclopentanecarboxylic acid and following the procedures set forth in Example 1 the desired product is recovered.

EXAMPLE 4

6-[[1-[[(2-HYDROXY-1-NAPHTHYL)METHYLENE]AMINO]-2,4-DIBUTYLCYCLOPENT-1-YL]CARBOXAMIDO]-PENCILLANIC ACID, SODIUM SALT, HYDRATE

By utilizing 1-amino-1-(2,4-dibutylcyclopentane)carboxylic acid in lieu of 1-amino-1-cyclopentanecarboxylic acid and following the procedures set forth in Example 1 the desired product is recovered.

EXAMPLE 5

6-[[1-[[(2-ETHOXYPHENYL)METHYLENE]AMINO]CYCLOPENT-1YL]CARBOXAMIDO]PENICILLANIC ACID, SODIUM SALT

By utilizing 2-ethoxybenzaldehyde in lieu of 2-hydroxy-1-naphthaldehyde and following the procedures set forth in Example 1 the desired product is recovered.

EXAMPLE 6

6-[[1-[[(2-BUTYLPHENYL)METHYLENE]AMINO]CYCLOPENT-1-YL]CARBOXAMIDO]PENICILLANIC ACID, SODIUM SALT

By utilizing 2-butylbenzaldehyde in lieu of 2-hydroxy-1-naphthaldehyde and following the procedures set forth in Example 1 the desired product is recovered.

EXAMPLE 7

6-[[1-[[(4-HYDROXYPHENYL)METHYLENE]AMINO]CYCLOPENT-1-YL]CARBOXAMIDO]PENICILLANIC ACID, SODIUM SALT

By utilizing 4-hydroxybenzaldehyde in lieu of 2-hydroxy-1-naphthaldehyde and following the procedures set forth in Example 1 the desired product is recovered.

EXAMPLE 8

6-[[1-[[(3-ISOPROPOXYPHENYL)METHYLENE]AMINO]CYCLOPENT-1-YL]CARBOXAMIDO]PENICILLANIC ACID, SODIUM SALT

By utilizing 3-isopropoxybenzaldehyde in lieu of 2-hydroxy-1-naphthaldehyde and following the procecures set forth in Example 1 the desired product is recovered.

EXAMPLE 9

6-[[1-[[(4-HEXYLPHENYL)METHYLENE]AMINO]CYCLOPENT-1-YL]CARBOXAMIDO]PENICILLANIC ACID, SODIUM SALT

By utilizing 4-hexylbenzaldehyde in lieu of 2-hydroxy-1-naphthaldehyde and following the procedures set forth in Example 1 the desired product is recovered.

EXAMPLE 10

6-[[1-[[(2-BUTOXYNAPHYL)METHYLENE]AMINO]CYCLOPENT-1-YL]CARBOXAMIDO]PENICILLANIC ACID, SODIUM SALT

By utilizing 2-butoxy-1-naphthaldehyde in lieu of 2-hydroxy-1-naphthaldehyde and following the procedures set forth in Example 1 the desired product is recovered.

EXAMPLE 11

6-[[1-[[(4-PENTYL-1-NAPHTHYL)METHYLENE]AMINO]CYCLOPENT-1-YL]CARBOXAMIDO]PENICILLANIC ACID, SODIUM SALT

By utilizing 5-pentyl-1-naphthaldehyde in lieu of 2-hydroxy-1-naphthaldehyde and following the procedures set forth in Example 1 the desired product is recovered.

EXAMPLE 12

6-[[1-[[(6-ISOPROPOXY-1-NAPHTHYL)METHYLENE]AMINO]CYCLOPENT-1-YL]CARBOXAMIDO]PENICILLANIC ACID, SODIUM SALT

By utilizing 6-isopropoxy-1-naphthaldehyde in lieu of 2-hydroxy-1-naphthaldehyde and following the procedures set forth in Example 1 the desired product is recovered.

EXAMPLE 13

6-[[1-[[(5-HYDROXY-1-NAPHTHYL)METHYLENE]AMINO]CYCLOPENT-1-YL]CARBOXAMIDO]PENICILLANIC ACID, SODIUM SALT

By utilizing 5-hydroxy-1-naphthaldehyde in lieu of 2-hydroxy-1-naphthaldehyde and following the procedures set forth in Example 1, the desired product is recovered.

EXAMPLE 14

6-[[1-[[(2,6-DIBUTYL-1-NAPHTHYL)METHYLENE]AMINO]CYCLOPENT-1-YL]CARBOXAMIDO]PENICILLANIC ACID, SODIUM SALT

By utilizing 2,6-dibutyl-1-naphthaldehyde in lieu of 2-hydroxy-1-naphthaldehyde and following the procedures set forth in Example 1, the desired product is recovered

EXAMPLE 15

6-[[1-[[(2-HYDROXY-1-NAPHTHYL)METHYL]AMINO]CYCLOPENT-1-YL]CARBOXAMIDE]PENICILLANIC ACID, HYDRATE

The product of Example 1 (0.92 millimoles) is dissolved in 300 ml of potassium phosphate buffer (0.5 M, pH 6), and to this solution is added 163 mg (4.27 millimoles) of $NaBH_4$ dissolved in 15 ml $H_2O$, dropwise, for 3 hours, with stirring, at a temperature of about 10°C. The reaction mixture is acidified to pH 3 in an ice bath, and centrifuged to separate a solid product. After washing the solid twice with 5 ml portions of cold water, it is dried in vacuo.

Emp. formula: $C_{25}H_{29}N_3SO_5$ (m.p. 180°–183°).

EXAMPLE 16

6-[[1-[[(2-HYDROXY-1-NAPHTHYL)METHYLENE]AMINO]CYCLOHEX-1-YL]CARBOXAMIDO]PENICILLANIC ACID, SODIUM SALT, HYDRATE

The title compound is obtained following the procedure of Example 1 but substituting 5.72 g of 1-amino-1-cyclohexanecarboxylic acid for 1-amino-1-cyclopentane carboxylic acid.

EXAMPLE 17

6-[[1-[[(2HYDROXYPHENYL)METHYL]AMINO]-CYCLOPENT-1-YL]CARBOXAMIDO]PENICILLANIC ACID, HYDRATE

The title compound is obtained following the procedure of Example 1 but substituting 6.28 g of 1-amino-1-cycloheptanecarboxylic acid for 1-amino-1-cyclopentane carboxylic acid, and treating the resulting 6-[[1-[[(2-hydroxyphenyl)-methylene]amino]cyclohept-1-yl]carboxamido]-penicillanic acid, sodium salt, hydrate, according to the procedure of Example 15.

EXAMPLE 18

6-[[1-[[(2-ETHOXYPHENYL)METHYL]AMINO]CYCLOHEX-1-YL]CARBOXAMIDO]PENICILLANIC ACID, HYDRATE

The title compound is obtained following the procedure of Example 1 but substituting 6.84 g of 1-amino-1-cyclooctane carboxylic acid for 1-amino-1-cyclopentane carboxylic acid, and treating the resulting 6-[[1-[[(2-ethoxyphenyl)-methylene]amino]cyclohex-1-yl]carboxamido]penicillanic acid, sodium salt, hydrate, according to the procedure of Example 15.

EXAMPLES 19–21

Following the procedure of Example 1 but substituting for 1-amino-1-cyclopentane carboxylic acid 40 millimoles of the compound listed in Column I, there is obtained the corresponding 6-[[1-[[(2-hydroxy-1-naphthyl)methylene]-amino]cycloalk-1-yl]carboxamido]penicillanic acid, hydrate, wherein the cycloalk-1-yl radical is as indicated in Column II.

| Ex. | I | II |
|---|---|---|
| 19 | 1-amino-2-hydroxycyclo-hexane carboxylic acid | 2-hydroxycyclohex-1-yl |
| 20 | 1-amino-2-ethylcyclo-heptane carboxylic acid | 2-ethylcyclohept-1-yl |
| 21 | 1-amino-3-fluorocyclo-hexane carboxylic acid | 3-fluorocyclohex-1-yl |

EXAMPLES 22–24

Following the procedure of Example 17 but substituting for 1-amino-1-cyclopentanecarboxylic acid 40 millimoles of the compound listed in Column I, there is obtained the corresponding 6-[[1-[[(2-hydroxy-1-naphthyl)methyl]amino]cycloalk-1-yl]carboxamido]-penicillanic acid, hydrate, wherein the cycloalk-1-yl radical is as indicated in Column II.

| Ex. | I | II |
|---|---|---|
| 22 | 1-amino-3-bromocyclo-hexane carboxylic acid | 3-bromocyclohex-1-yl |
| 23 | 1-amino-3-methyl-4-hydroxy-cyclohexane carboxylic acid | 3-methyl-4-hydroxy-cyclohex-1-yl |
| 24 | 1-amino-2-propyl-3-chloro-cyclopentane carboxylic acid | 2-propyl-3-chlorocyclo-pent-1-yl |

EXAMPLES 25–28

Following the procedure of Example 1 but substituting for 2-hydroxy-1-naphthaldehyde 80 millimoles of the aldehyde listed in Column I, there is obtained the corresponding compound of formula I wherein m and n are 0, Z is Na and R' is as indicated in Column II.

| Ex. | I | II |
|---|---|---|
| 25 | 2-fluorobenzaldehyde |  |
| 26 | 4-chlorobenzaldehyde |  |
| 27 | 2-amidonaphthaldehyde | 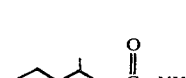 |
| 28 | 2-acetylbenzaldehyde | 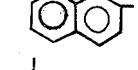 |

EXAMPLES 29–32

Following the procedure of Example 15 but employing as starting material, respectively, the final product of Examples 25–28, there is obtained the corresponding reduced compound of Formula II.

What is claimed is:

1. A compound of the formula

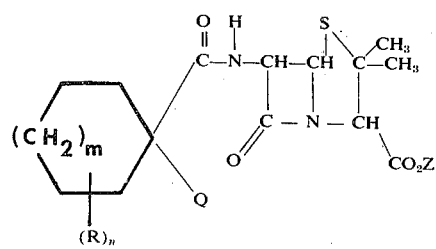

wherein $m$ is 0, 1 or 2; Q is —N=CHR$^1$ or —NH-CH$_2$R$^3$ wherein R$^1$ is alkyl of from 1 to 7 carbon atoms, cycloalkyl of from 5 to 7 carbon atoms, phenyl, naphthyl, substituted phenyl or naphthyl wherein the substituent is halogen, hydroxy, amido, alkyl of from 1 to 4 carbon atoms, alkoxy of from 1 to 4 carbon atoms, or acyl of from 1 to 4 carbon atoms; $n$ is 0, 1, 2 or 3; R is alkyl of from 1 to 7 carbon atoms, hydroxy or halogen, and R$^2$ is cycloalky of from 5 to 7 carbon atoms; and Z is hydrogen, alkyl of from 1 to 7 carbon atoms, or a pharmaceutically acceptable alkali metal or alkaline earth metal or a pharmaceutically acceptable organic base selected from triethylamine, procaine, dibenzylamine, N-benzyl-β-phenethylamne, N,N'-dibenzylethylenediamine, or N-ethylpiperidine.

2. A compound of claim 1 wherein Q is —N=CHR$^1$.

3. A compound of claim 2 wherein R$^1$ is substituted phenyl or substituted naphthyl the substituent being halogen, hydroxy, amido, alkyl of from 1 to 4 carbons, alkoxy of from 1 to 4 carbons or acyl of from 1 to 4 carbon atoms.

4. A compound of claim 5 wherein the substituent is in the ortho position.

5. A compound of claim 1 having the name 6-[[1-[[(2-hydroxy-1-naphthyl) methylene] amino] cyclopent-1-yl]-carboxamido] pencillanic acid, sodium, salt, hydrate.

6. A compound of claim 1 having the name 6-[[1-[[(2-hydroxy-1-naphthyl)methyl]amino]cyclopent-1-yl]carboxamide]-penicillanic acid, hydrate.

* * * * *

UNITED STATES PATENT AND TRADEMARK OFFICE
CERTIFICATE OF CORRECTION

PATENT NO. : 3,904,604
DATED : Sept. 9, 1975
INVENTOR(S) : Bong Kuk Lee et al.

It is certified that error appears in the above-identified patent and that said Letters Patent are hereby corrected as shown below:

In the abstract, structure I should read

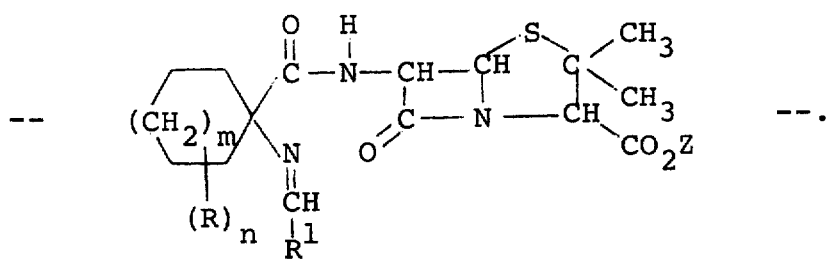

In the abstract, structure II should read

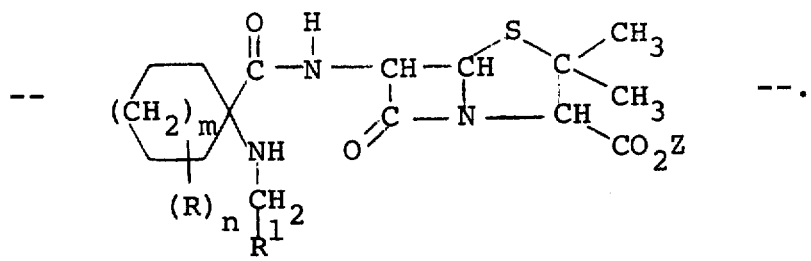

Col. 1, line 26, "wherein propyl" should read --wherein $R^1$ is alkyl of from 1 to 7 carbon atoms (methyl, ethyl, propyl--.

Col. 1, line 50, "3-ethylpenty" should read --3-ethylpentyl--.

Col. 2, line 42, in the structure, 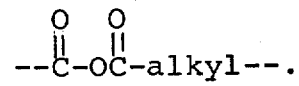 should read $$--\overset{O}{\underset{\|}{C}}-O\overset{O}{\underset{\|}{C}}-alkyl--.$$

Col. 3, line 57, "postiive" should read --positive--.

UNITED STATES PATENT AND TRADEMARK OFFICE
CERTIFICATE OF CORRECTION

PATENT NO. : 3,904,604

DATED : Sept. 9, 1975

INVENTOR(S) : Bong Kuk Lee et al.

It is certified that error appears in the above-identified patent and that said Letters Patent are hereby corrected as shown below:

Col. 5, last line, "GG105a" should be deleted.

Col. 6, line 50, "172" should read --175--.

Col. 10, claim 1, the structure should read

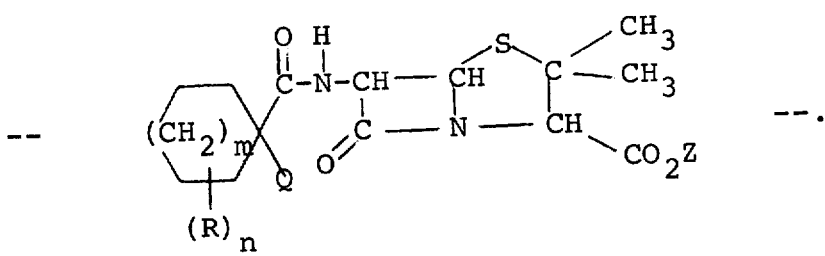

Col. 11, line 1, "-NH-CH$_2$R$^3$" should read -- -NH-CH$_2$R$^2$ --.

Col. 11, line 7, "cycloalky" should read --cycloalkyl--.

Col. 11, line 14, "phenethylamne" should read --phenethylamine--.

Col. 12, line 6, "claim 5" should read --claim 3--.

Signed and Sealed this seventeenth Day of February 1976

[SEAL]

Attest:

RUTH C. MASON
Attesting Officer

C. MARSHALL DANN
Commissioner of Patents and Trademarks